United States Patent
Stultz

(10) Patent No.: US 8,427,769 B1
(45) Date of Patent: Apr. 23, 2013

(54) MULTI-STAGE LYOT FILTER AND METHOD

(75) Inventor: Robert D. Stultz, Cypress, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 13/325,620

(22) Filed: Dec. 14, 2011

(51) Int. Cl.
*G02B 5/22* (2006.01)
*G02F 1/03* (2006.01)
*H01S 3/106* (2006.01)

(52) U.S. Cl.
USPC .............................. 359/885; 372/20

(58) Field of Classification Search .............. 359/885; 372/20; *H01S 3/106; G02B 5/22; G02F 1/03*
See application file for complete search history.

(56) References Cited

U.S. PATENT DOCUMENTS

| | | | | |
|---|---|---|---|---|
| 2,718,170 A * | 9/1955 | Lyot | .............................. | 356/365 |
| 3,438,692 A * | 4/1969 | Tabor | ...................... | 359/489.07 |
| 3,572,895 A * | 3/1971 | Schmidt et al. | .......... | 359/489.09 |
| 4,269,481 A * | 5/1981 | Yeh et al. | ...................... | 359/259 |
| 4,914,664 A * | 4/1990 | Woodward | ...................... | 372/20 |
| 5,132,826 A * | 7/1992 | Johnson et al. | ................... | 349/18 |
| 5,175,736 A * | 12/1992 | Woodward et al. | ............. | 372/20 |
| 5,231,521 A * | 7/1993 | Johnson et al. | ................... | 349/18 |
| 5,479,422 A * | 12/1995 | Fermann et al. | ................ | 372/18 |
| 5,626,408 A * | 5/1997 | Heynderickx et al. | .......... | 353/20 |
| 5,828,489 A * | 10/1998 | Johnson et al. | .......... | 359/485.02 |
| 6,373,868 B1 * | 4/2002 | Zhang | .............................. | 372/19 |
| 6,590,922 B2 * | 7/2003 | Onkels et al. | .................... | 372/57 |
| 7,400,448 B2 * | 7/2008 | Hutchin | ................... | 359/489.07 |
| 2001/0028461 A1 * | 10/2001 | Hill et al. | ...................... | 356/493 |
| 2005/0041718 A1 * | 2/2005 | Eisenbarth et al. | ............. | 372/94 |

* cited by examiner

*Primary Examiner* — Mark Hellner
*Assistant Examiner* — Ari M Diacou

(57) ABSTRACT

According to an embodiment of the disclosure, a multi-stage Lyot filter comprises a plurality of prisms, a polarizing block, and a non-rotating, single-adjustment birefringent element. Each of the prisms is configured to receive light and to reflect the light. The polarizing block is configured to provide polarization discrimination of the light. The birefringent element is configured to tune the Lyot filter. The prisms are further configured to pass the light through the birefringent element multiple times.

20 Claims, 7 Drawing Sheets

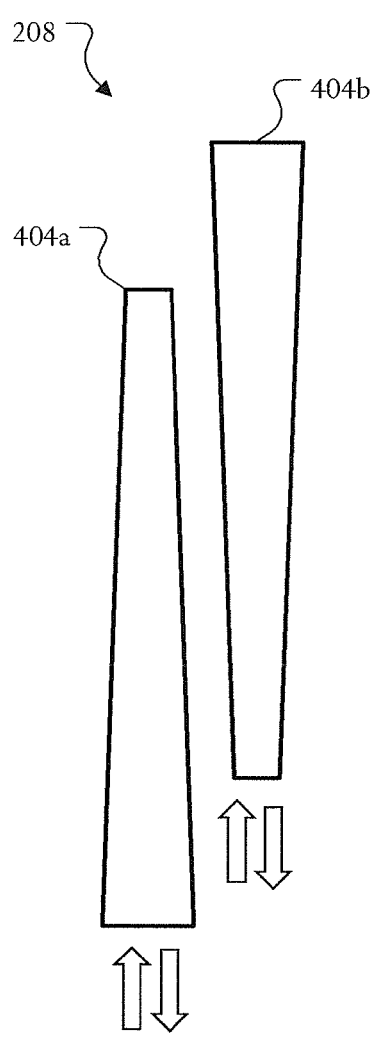
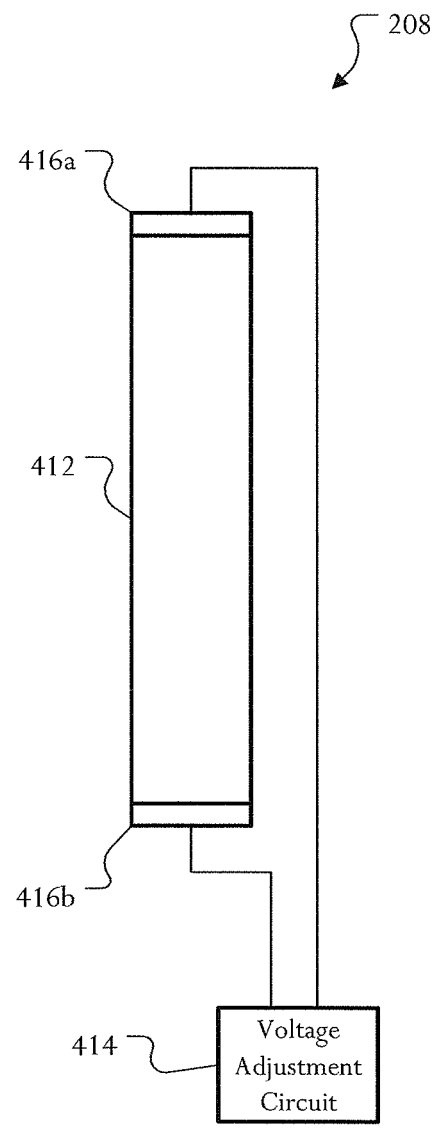
FIG. 5A
FIG. 5B

MULTI-STAGE LYOT FILTER AND METHOD

TECHNICAL FIELD

The present disclosure is directed, in general, to lasers and, more specifically, to a multi-stage Lyot filter and method.

BACKGROUND OF THE DISCLOSURE

A Lyot filter is an optical filter that passes a relatively narrow band of wavelengths by using birefringent materials, such as plates made from quartz. A conventional Lyot filter is often formed by using one or more of these birefringent plates oriented at Brewster's angle. Each plate corresponds to a stage of the Lyot filter. For example, a typical three-stage Lyot filter has three birefringent plates. When more than one birefringent plate is used in a Lyot filter, each plate added is twice the size of the previous plate. For a three-stage Lyot filter, therefore, the thicknesses of the three plates are d, 2 d and 4 d. Thus, in order to implement a multi-stage Lyot filter, the plates have to be manufactured precisely to provide the desired thicknesses relative to each other. In addition, Lyot filters generally include parallel linear polarizers before and after each stage.

In order to tune a conventional multi-stageLyot filter to a particular wavelength, each of the separate plates has to be rotated. In addition, an uncoatedLyot filter at Brewster's angle has limited hold-off when tuning away from the gain peak is attempted. Other types of Lyot filters have been implemented that use angle-tuning of a diffraction grating or a volume Bragg grating mirror. However, these types of filters also require some type of rotation for tuning. Some multi-stageLyot filters have been implemented using electro-optic crystals. However, in order to tune these filters, the voltage applied to each of the electro-optic crystals will likely have to be individually adjusted. Lyot filters with liquid crystals or piezo-tunable etalons are also available. However, these types of filters are not useful for intracavity tuning of Q-switched lasers because liquid crystals have low damage thresholds and high-finesse etalons have internal intensities that are significantly higher than that of the resonator cavity.

SUMMARY OF THE DISCLOSURE

This disclosure provides a multi-stage Lyot filter and method.

In one embodiment, a multi-stage Lyot filter is provided that includes a plurality of prisms, a polarizing block, and a non-rotating, single-adjustment birefringent element. Each of the prisms is configured to receive light and to reflect the light. The polarizing block is configured to provide polarization discrimination of the light. The birefringent element is configured to tune the Lyot filter. The prisms are further configured to pass the light through the birefringent element multiple times.

In another embodiment, an optical cavity is provided that includes a gain medium, a Q-switch, a reflector and a multi-stage Lyot filter. The gain medium is configured to provide optical gain for light in the optical cavity. The Q-switch is configured to provide variable attenuation for the optical cavity. The reflector is configured to partially reflect the light. The multi-stage Lyot filler is configured to pass a specified band of wavelengths of the light. The Lyot filter comprises a non-rotating, single-adjustment birefringent element that is configured to tune the Lyot filter and multiple prisms that are configured to pass the light through the birefringent element multiple times.

In yet another embodiment, a method is provided that includes receiving light at a multi-stage Lyot filter that comprises a non-rotating, single-adjustment birefringent element. The light is passed through the birefringent element multiple times to generate filtered light. The filtered light is provided as an output of the Lyot filter.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which:

FIGS. 5A and 5B illustrate the birefringent element of FIG. 3A in accordance with alternate embodiments of the present disclosure;

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
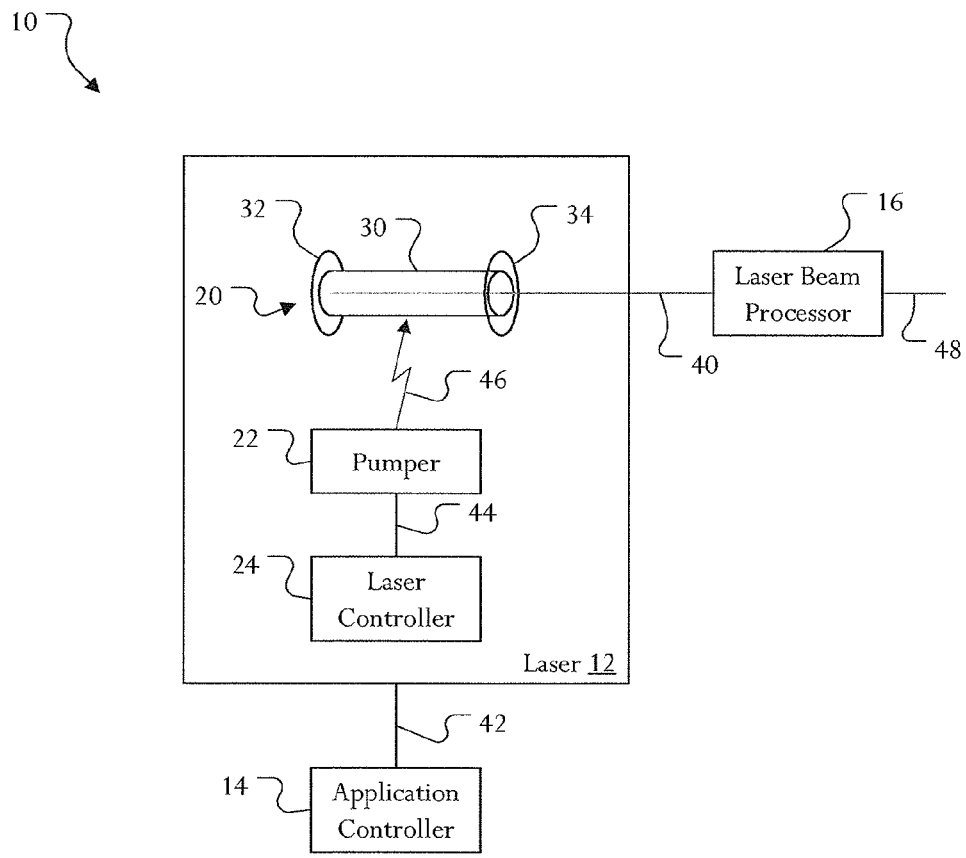
FIG. 1 illustrates an application including a laser in accordance with the present disclosure.

FIG. 1 illustrates an application 10 that includes a laser 12 in accordance with the present disclosure. The embodiment of the application 10 shown in FIG. 1 is for illustration only. Other embodiments of the application 10 could be used without departing from the scope of this disclosure.

In addition to the laser 12, the application 10 comprises an application controller 14 and a laser beam processor 16. The application 10 may be configured to perform any suitable operation that uses the laser 12 in its implementation. For example, the application 10 may be used for cutting, drilling, welding, engraving, cladding, aligning, micro-machining, heat-treating, imaging, ablating or any other suitable operation. The application 10 may be useful for industrial purposes, medical purposes, microelectronics manufacturing, graphics purposes, law enforcement purposes, entertainment purposes, scientific research, consumer electronics, defense or military purposes and/or for any other suitable purpose.

Depending on the application 10, the laser 12 may comprise a gas laser, a chemical laser, a solid-state laser, a fiber laser, a semiconductor laser or other suitable type of light source. Also depending on the application 10, the laser 12 may be configured to operate in a continuous wave mode and/or a pulsed mode, such as Q-switched, mode-locked, pulse-pumped and/or other suitable pulsed mode.

For the illustrated embodiment, the laser 12 comprises an optical cavity 20, a pumper 22, and a laser controller 24. The optical cavity 20 comprises a gain medium 30, a reflector 32 and an output coupler 34. The gain medium 30 comprises any suitable material that may be pumped by the pumper 22 in order to provide optical gain for the laser 12. The reflector 32 may comprise a high-reflectivity mirror that is configured to reflect substantially all the light from the gain medium 30 back through the optical cavity 20. The output coupler 34 may comprise a partially reflective mirror. The output coupler 34 is configured to reflect a portion of the light from the gain medium 30 back through the optical cavity 20 and to transmit another portion of the light from the gain medium 30 as an output laser beam 40.

The laser controller 24 is configured to control the pumper 22. For example, based on a control signal 42 from the application controller 14, the laser controller 24 may be configured to turn the pumper 22 on and off by generating a pumper signal 44. The pumper 22 is configured to generate energy 46 based on the pumper signal 44 and to direct that energy 46 toward the gain medium 30 of the optical cavity 20.

The application controller 14 is configured to provide control of the laser 12 for the application 10. For example, the application controller 14 may be configured to generate the control signal 42 in order to activate the laser 12 such that the application 10 may use the laser 12 to perform a specified task. In addition, the application controller 14 may be configured to deactivate the laser 12 when the task is completed. The application controller 14 may also be configured to provide control of other components of the application 10, such as the laser beam processor 16 and/or other suitable components (not shown in FIG. 1).

The laser beam processor 16 is configured to process the laser beam 40 in accordance with the application 10 in order to generate a processed laser beam 48. For example, the laser beam processor 16 may be configured to route the laser beam 40 based on the application 10. As a specific example, the laser beam processor 16 may be configured to direct the processed laser beam 48 toward a predetermined target, such as a mortar, a machine, electronics, a vehicle, a body part, or any other suitable target.

Although FIG. 1 illustrates one example of an application 10 including a laser 12, various changes may be made to FIG. 1. For example, the makeup and arrangement of the application 10 are for illustration only. Components could be added, omitted, combined, subdivided, or placed in any other suitable configuration according to particular needs. In addition, FIG. 1 illustrates one environment in which the laser 12 may be implemented. However, the laser 12 may be used in any other suitable system without departing from the scope of this disclosure.

Figure 2:
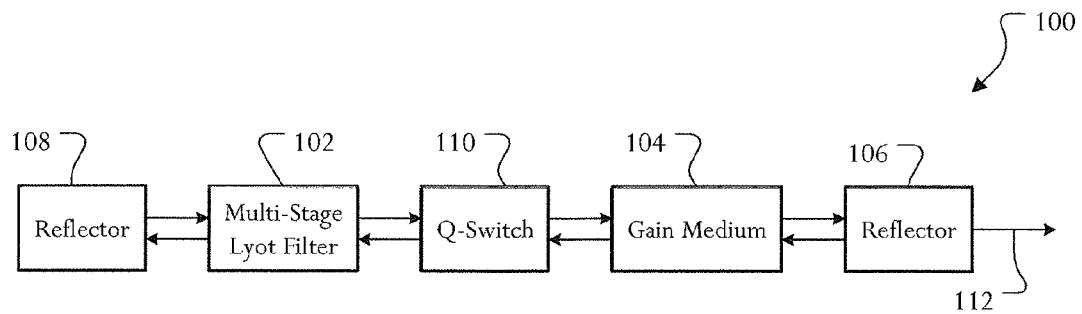
FIG. 2 illustrates an optical cavity of a Q-switched laser in which a multi-stage Lyot filter may be implemented in accordance with the present disclosure.

FIG. 2 illustrates an optical cavity 100 of a Q-switched laser in which a multi-stage Lyot filter 102 may be implemented in accordance with the present disclosure. The embodiment of the optical cavity 100 shown in FIG. 2 is for illustration only. Other embodiments of the optical cavity 100 could be used without departing from the scope of this disclosure.

The Lyot filter 102 is configured to filter light passed through the optical cavity 100 in order to tune the laser to a particular wavelength. The Lyot filter 102 is tunable such that the laser may be tuned to varying wavelengths based on the tuning of the Lyot filter 102. As described in more detail below, the Lyot filter 102 may be tuned with a single linear translation adjustment, i.e., without any components being rotated. In addition, the Lyot filter 102 is configured to tune the laser over a broad spectral range. For example, for some embodiments, the Lyot filter 102 may comprise a free spectral range of at least 100 nm or greater when the wavelength of transmission peaks is near 2.0 μm. The Lyot filter 102 may also tune the laser without affecting alignment of the optical cavity 100.

As described in more detail below, the Lyot filter 102 comprises robust materials and, thus, has a high optical damage threshold. Furthermore, the Lyot filter 102 may comprise an internal intensity that is not greater than the internal intensity of the optical cavity 100. Therefore, the Lyot filter 102 may be implemented in a Q-switched laser without being susceptible to damage related to the relatively high energy associated with Q-switching.

In addition to the Lyot filter 102, the illustrated optical cavity 100 comprises a gain medium 104, two reflectors 106 and 108, and a Q-switch 110. The gain medium 104 may comprise any suitable material that may be pumped in any suitable manner (by components not illustrated in FIG. 2) in order to provide optical gain for the laser. The first reflector 106 is an output coupler, i.e., a partially reflective mirror. Thus, the first reflector 106 is configured to reflect a portion of the light from the gain medium 104 and to transmit another portion of the light from the gain medium 104 as an output beam 112. The second reflector 108, which may be optional as described in more detail below, is a high-reflectivity mirror. The second reflector 108 is configured to reflect substantially all the light received from the Lyot filter 102 back to the Lyot filter 102.

The Q-switch 110 is configured to provide variable attenuation for the optical cavity 100 by varying the quality factor (or Q factor) of the optical cavity 100. For example, the Q-switch 110 may be switched on in order to attenuate the light in the optical cavity 100 by increasing losses in the optical cavity 100. This results in a decrease of the Q factor and essentially prevents feedback of light into the gain medium 104. However, the gain medium 104 may continue to be pumped while the Q factor is kept low, resulting in energy being stored in the gain medium 104. After sufficient energy has been stored in the gain medium 104, the Q-switch 110 may be actively switched in order to increase the Q factor, allowing feedback of light into the gain medium 104. At this point, the energy stored in the gain medium 104 allows the intensity of the light to increase relatively quickly, resulting in a pulsed output beam of light 112 that has a relatively high peak power as compared to a constant output beam of light generated by an optical cavity without a Q-switch 110.

Although the illustrated optical cavity 100 shows the components 102, 104, 106, 108 and 110 in a particular arrangement, it will be understood that the optical cavity 100 may be otherwise suitably arranged without departing from the scope of this disclosure. For example, the Lyot filter 102 or the Q-switch 110 may be located between the gain medium 104 and the first reflector 106, the Q-switch 110 may be located between the Lyot filter 102 and the second reflector 110, or any other suitable arrangement may be implemented. In addition, the Lyot filter 102 may be used in a continuous-wave (CW) laser resonator cavity where the Q-switch 110 is not employed. Also, the Q-switch 110 may be either active or passive. An active Q-switch increases the cavity Q factor after a trigger signal is received. A passive Q-switch does not require a trigger signal in order to increase the Q factor.

For some embodiments, the optical cavity 100 may correspond to the optical cavity 20, the gain medium 104 may correspond to the gain medium 30, the first reflector 106 may correspond to the output coupler 34, the second reflector 108 may correspond to the reflector 32, and the output beam 112 may correspond to the laser beam 40.

Figure 3A:
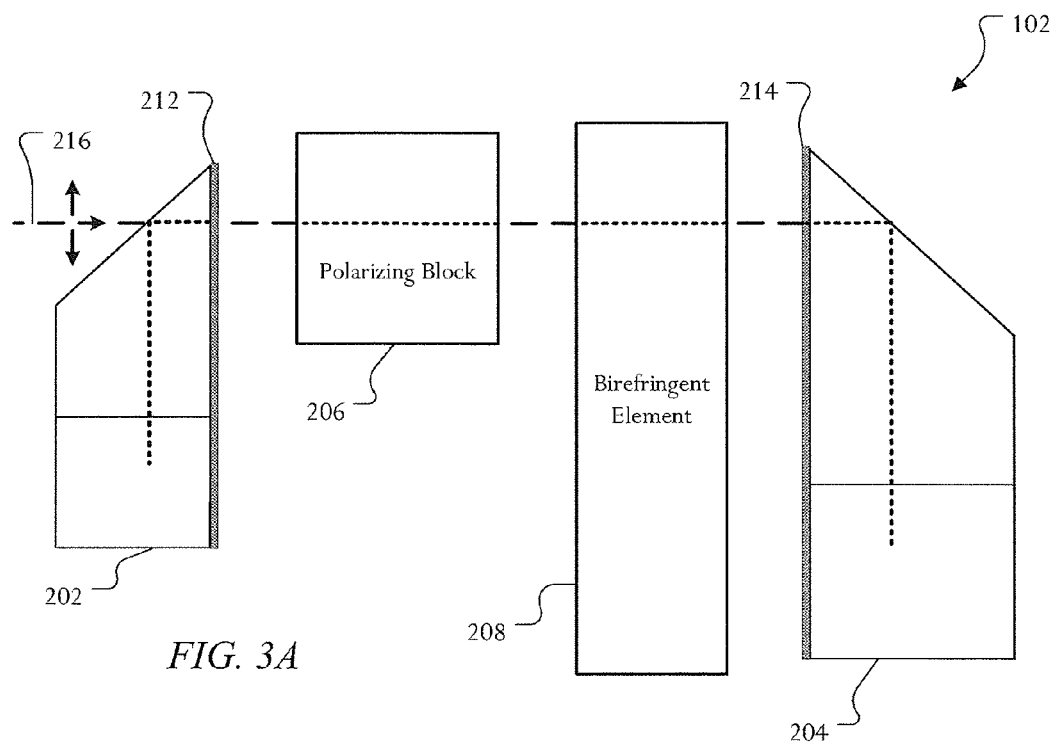
FIGS. 3A and 3B illustrate details of the multi-stage Lyot filter of FIG. 2 in accordance with the present disclosure.
Figure 3B:
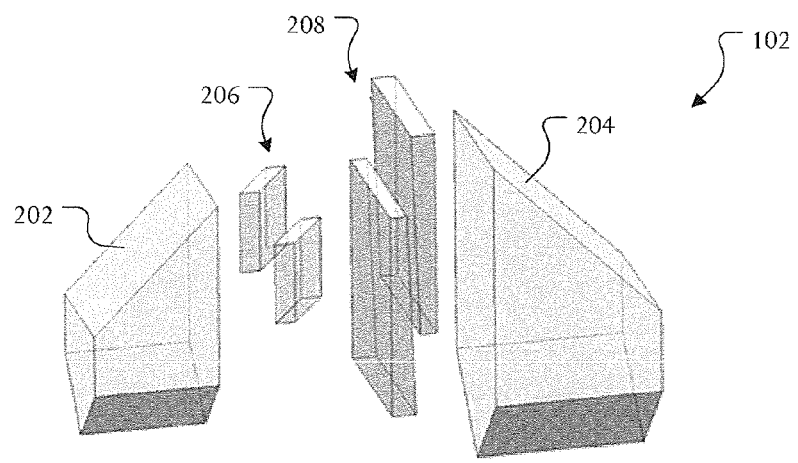

FIGS. 3A and 3B illustrate details of the multi-stage Lyot filter 102 in accordance with the present disclosure. The embodiments of the Lyot filter 102 shown in FIGS. 3A and 3B are for illustration only. Other embodiments of the Lyot filter 102 could be used without departing from the scope of this disclosure. In addition, the Lyot filer 102 may be implemented in any suitable system other than the optical cavity 100 of FIG. 2 without departing from the scope of this disclosure. For example, the Lyot filter 102 may be used to tune any suitable laser resonator, laser beam or other light. Also, this Lyot filter 102 is not limited to optical systems that include a laser. Other non-laser applications are possible, e.g., passive spectral imaging.

As shown in FIG. 3A, the Lyot filter 102 comprises a first prism 202, a second prism 204, a polarizing block 206 and a birefringent element 208. In addition, a first polarization rotation compensator 212 may be coupled to an entrance/exit surface of the first prism 202 and a second polarization rotation compensator 214 may be coupled to an entrance/exit surface of the second prism 204 in any suitable manner. For example, the rotation compensators 212 and 214 may be deposited on or bonded to the surfaces of the prisms 202 and 204. Alternatively, one or both of the rotation compensators 212 and 214 may be implemented as a separate component near, but not coupled to, the prism 202 and/or the prism 204. Each of the rotation compensators 212 and 214 is configured to compensate for any geometrical polarization rotation in the prisms 202 and 204.

For some embodiments, the prisms 202 and 204 may each comprise a Benson prism. For these embodiments, the rotation compensators 212 and 214 comprise quarter-wavelength plate layers that are configured to compensate for the geometrical polarization rotation in the Benson prisms 202 and 204, respectively. Thus, each of the prisms 202 and 204, in conjunction with its corresponding rotation compensator 212 and 214, is configured to receive a beam of light, fold the beam of light through the prism 202 or 204, and reflect that beam of light back out of the prism 202 or 204 while preserving the polarization state of the beam. The prisms 202 and 204 may each comprise fused silica, BK7 optical glass or other suitable material. For some embodiments, the rotation compensators 212 and 214 may each comprise crystalline quartz or other suitable material. The rotation compensators 212 and 214 comprise broadband plate layers, i.e., the rotation compensators 212 and 214 may be relatively insensitive to wavelength. In general, true zero-order waveplate thick layers bonded or otherwise deposited on the appropriate prism surfaces are desirable for the rotation compensators.

For some embodiments, one of the prisms 202 or 204 may function as the second reflector 108 in the optical cavity 100. Thus, for these embodiments, the second reflector 108 may be omitted as a separate component of the optical cavity 100. In the embodiments where one (or both) of the prisms 202, 204 is a Benson prism, then the orthogonal roof surfaces of the Benson prism may serve as the second reflector 108 in the optical cavity 100.

The polarizing block 206 is configured to provide polarization discrimination by passing light with a specified polarization and blocking light with polarizations other than the specified polarization. For some embodiments, the polarizing block 206 may comprise at least one uncoated Brewster plate.

For example, for embodiments in which the Lyot filter 102 is used for tuning inside an optical cavity, such as the optical cavity 100 of FIG. 2, an uncoated Brewster plate may provide sufficient polarization discrimination. For these embodiments, the polarizing block 206 may comprise fused silica, BK7 optical glass or other suitable material.

For other embodiments, the polarizing block 206 may comprise at least one high-contrast polarizer. For example, for embodiments in which the Lyot filter 102 is used for tuning outside an optical cavity, a high-contrast polarizer may be used to provide additional polarization discrimination. For some embodiments, the polarizing block 206 may comprise at least one high-extinction polarizer that is configured to increase in-band and out-of-band contrast. These embodiments may be employed inside a resonator cavity, where the polarizing block 206 is configured to prevent parasitic lasing when tuning away from the laser gain peak.

The birefringent element 208 is a non-rotating, single-adjustment birefringent element that comprises any suitable birefringent material. Thus, the birefringent element 208 may be tuned with a single adjustment and without rotation of any components. Based on the tuning of the birefringent element 208, the Lyot filter 102 may be configured to pass a particular, narrow band of wavelengths. As described in more detail below in connection with FIGS. 5A and 5B, the birefringent element 208 may comprise a pair of birefringent wedges or an electro-optic crystal.

FIG. 3B illustrates one embodiment of the Lyot filter 102 of FIG. 3A in a three-dimensional form. For this embodiment, the polarizing block 206 comprises a pair of polarizers and the birefringent element 208 comprises a pair of birefringent wedges. This embodiment is described in more detail below in connection with FIG. 6A. The polarization rotation compensators 212 and 214 are not shown in FIG. 3B.

In operation, a beam of light 216 enters the Lyot filter 102 and passes in front of the first prism 202. The light then travels through the polarizing block 206 and the birefringent element 208, before passing through the rotation compensator 214 and the second prism 204. Although not shown in FIG. 3A or 3B, the light is then reflected back and forth through the Lyot filter 102 multiple times via prisms 202 and 204 such that the light passes through the birefringent element 208 a specified number of times based on the number of stages desired for the Lyot filter 102.

For example, for a three-stage Lyot filter 102, the prisms 202 and 204 could pass the light through the polarizing block 206, through the birefringent element 208 once, through the polarizing block 206, through the birefringent element 208 twice, through the polarizing block 206, through the birefringent element 208 four times, and through the polarizing block 206 again. Thus, in this way, the multiple thicknesses for the multiple stages are provided by a single birefringent element 208. For example, to achieve the passing of light through a thickness of 2 d, where d is the thickness of the birefringent element 208, the light is passed through the birefringent element 208 twice. Similarly, to achieve the passing of light through a thickness of 4 d, the light is passed through the birefringent element 208 four times. It will be understood that the light may pass through the Lyot filter 102 such that the thicknesses d, 2 d and 4 d are provided in any order.

As a result, additional stages of the Lyot filter 102 do not require multiple components to be produced with precision relative to one another because a single component is used to generate each multiple of thickness. In addition, the same polarizing block 206 may be used for each stage. Therefore, the polarizing block 206 does not need to be aligned parallel to other polarizers and a single component may be implemented to provide polarization before and after each of the stages. In this way, a Lyot filter 102 is provided that has multiple stages generated by multi-passing a beam of light through a single birefringent element 208 using prisms 202 and 204.

Figure 4:
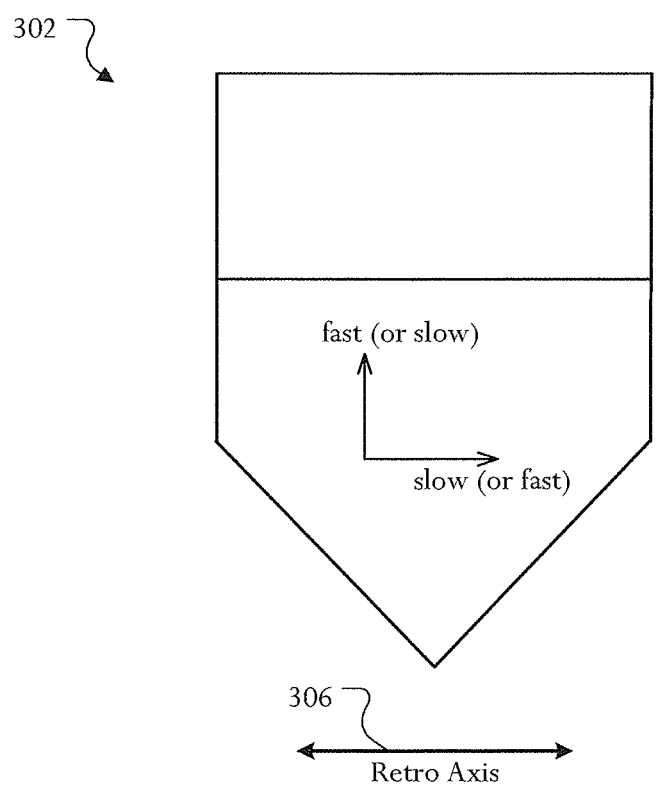
FIG. 4 illustrates one of the prisms of FIG. 3A from a rear view in accordance with the present disclosure.

FIG. 4 illustrates a prism 302 from a rear view in accordance with the present disclosure. The prism 302, which may correspond to the prism 202 and/or the prism 204 of FIG. 3A, has a retro axis 306 that is oriented as shown in FIG. 4. The polarization rotation compensator 212, 214 is located on the ray entrance/exit surface of the prism 302, which is parallel to the plane of the page. The polarization rotation compensator 212, 214 comprises a thin layer of birefringent material with the fast and slow axes of this crystalline layer oriented as shown in FIG. 4. The material used for the rotation compensator 212, 214 may or may not be the same as that used for the birefringent element 208 of the Lyot filter 102. For some embodiments, the rotation compensator 212, 214 comprises crystalline quartz. The retro axis 306 of the prism 302 is formed by the orthogonal roof surfaces at the bottom of the prism 302 shown in FIG. 4. Rays incident on one of these surfaces will be totally-internally-reflected (TIR) onto the second of the two roof surfaces. The rays will then be TIR'd off the second roof surface. The rays incident on the prism 302 come in through the top rectangular section of the prism 302. There is a third TIR surface not shown in FIG. 4 that reflects these incident rays down to the roof surfaces. The roof surfaces reflect the rays back up and the rays exit through the top rectangular region. The incident and exit rays in FIG. 4 are not parallel to the plane of the page, but enter/exit into and out of the page. Any ray incident on the prism 302 that is tilted in the retro axis plane will be reflected back parallel to the incident direction. The exit ray location will be on the opposite side of the roof vertex relative to the incident ray location and will be equidistant from a plane perpendicular to the page of FIG. 4 that goes through the roof vertex and straight up through the center axis of the prism 302.

FIGS. 5A and 5B illustrate the birefringent element 208 in accordance with alternate embodiments of the present disclosure. As shown in FIG. 5A, the birefringent element 208 may comprise a pair of birefringent wedges 404a and 404b. Each birefringent wedge 404 may comprise crystalline quartz, calcite or any other suitable birefringent material. A first birefringent wedge 404a is situated in a first direction, while a second birefringent wedge 404b is situated in a second direction that is opposite the first direction.

The birefringent element 208 of FIG. 5A may also comprise any suitable mechanism (not shown in FIG. 5A) for linearly translating either one or both of the wedges 404a and 404b. Thus, although the illustrated embodiment indicates linear movement of both wedges 404a and 404b with arrows, it will be understood that the birefringent element 208 may be implemented such that only one of the wedges 404a or 404b may be linearly translated with respect to the other wedge 404b or 404a without departing from the scope of this disclosure.

As shown in FIG. 5A, the wedges 404 are each tapered such that when the wedges 404 are linearly translated with respect to each other, the overall thickness of the birefringent element 208 is changed. Thus, using the embodiment of FIG. 5A, the thickness, d, of the birefringent element 208 may be changed by linearly translating one or both of the wedges 404a and 404b such that the thickness of the overlap of the wedges 404 is altered. For example, if the wedge 404a is moved up and/or the wedge 404b is moved down, the thickness of the birefringent element 208 is increased until the wedges 404a and 404b are aligned with each other. Similarly, if the wedge 404a is moved down and/or the wedge 404b is moved up, the thickness of the birefringent element 208 is decreased. Because the thickness of the birefringent element 208 is related to the wavelength of the Lyot filter 102, changing the thickness results in a change in the wavelength that is passed by the Lyot filter 102. Thus, the Lyot filter 102 may be tuned by translating at least one of the wedges 404 to change the thickness.

As shown in FIG. 5B, the birefringent element 208 may comprise an electro-optic crystal 412. The electro-optic crystal 412 may comprise any suitable birefringent material with a birefringence that may be altered based on an applied voltage. The birefringent element 208 of FIG. 5B also comprises a voltage adjustment circuit 414 that is coupled to the electro-optic crystal 412 via two electrodes 416a and 416b. The diagram shown in FIG. 5B illustrates one notional configuration of the electrodes 416a and 416b, but other configurations are possible. The electrodes 416a and 416b in the configuration shown produce an electric field that is transverse (perpendicular) to the optical beam directions propagating through the electro-optic crystal 412. Electro-optic crystals such as lithium niobate operate in this manner. Normally, it is desirable to apply this electric field in the thinnest transverse axis possible so as to reduce the electrode voltage required to produce a given change in birefringence. Therefore, the precise orientation of the electrode axis may depend on other design constraints to the crystal transverse dimensions. In addition, some electro-optic crystals, such as KDP, are switched via an electric field that is parallel to the optical beam axis.

Using the embodiment of FIG. 5B, a birefringence, $\Delta n$, of the birefringent element 208 may be changed by altering the voltage applied to the electrodes 416 by the voltage adjustment circuit 414. For example, if the voltage adjustment circuit 414 increases the voltage differential applied to the electrodes 416a and 416b, the birefringence of the birefringent element 208 may be increased. Similarly, if the voltage adjustment circuit 414 decreases the voltage differential applied to the electrodes 416a and 416b, the birefringence of the birefringent element 208 may be decreased. Because the birefringence of the birefringent element 208 is related to the wavelength of the transmission peaks of the Lyot filter 102, changing the birefringence results in a change in the peak wavelength that is passed by the Lyot filter 102. Thus, the Lyot filter 102 may be tuned by changing the voltage applied to the electro-optic crystal 412 to change the birefringence.

Therefore, using either the pair of wedges 404 or the electro-optic crystal 412, the Lyot filter 102 may be tuned through the use of a single adjustment of the birefringent element 208 and without rotating any components of the birefringent element 208. As used herein, a "single adjustment" means one adjustment of one aspect (e.g., the thickness or birefringence) of the birefringent element 208. Thus, for example, the single adjustment for the pair of wedges 404 may comprise moving one wedge 404a up and the other wedge 404b down to adjust the thickness of the pair of wedges 404. However, multiple adjustments do not need to be made because the multi-stage Lyot filter 102 has a single birefringent element 208 instead of a birefringent element for each stage.

Figure 6A:
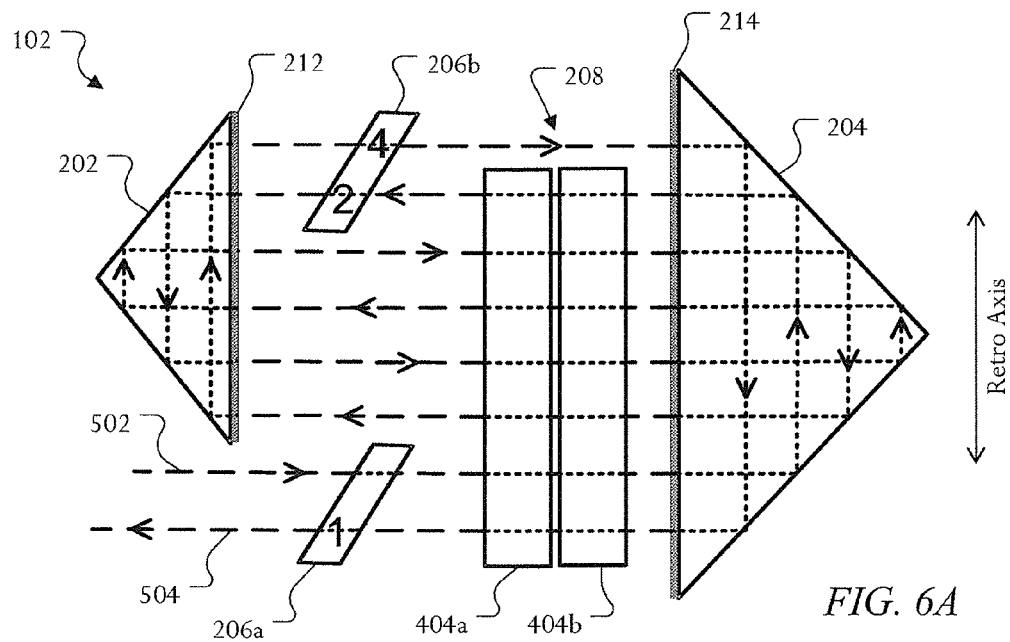
FIGS. 6A and 6B illustrate the multi-stage Lyot filter of FIG. 3A in accordance with alternate embodiments of the present disclosure.
Figure 6B:
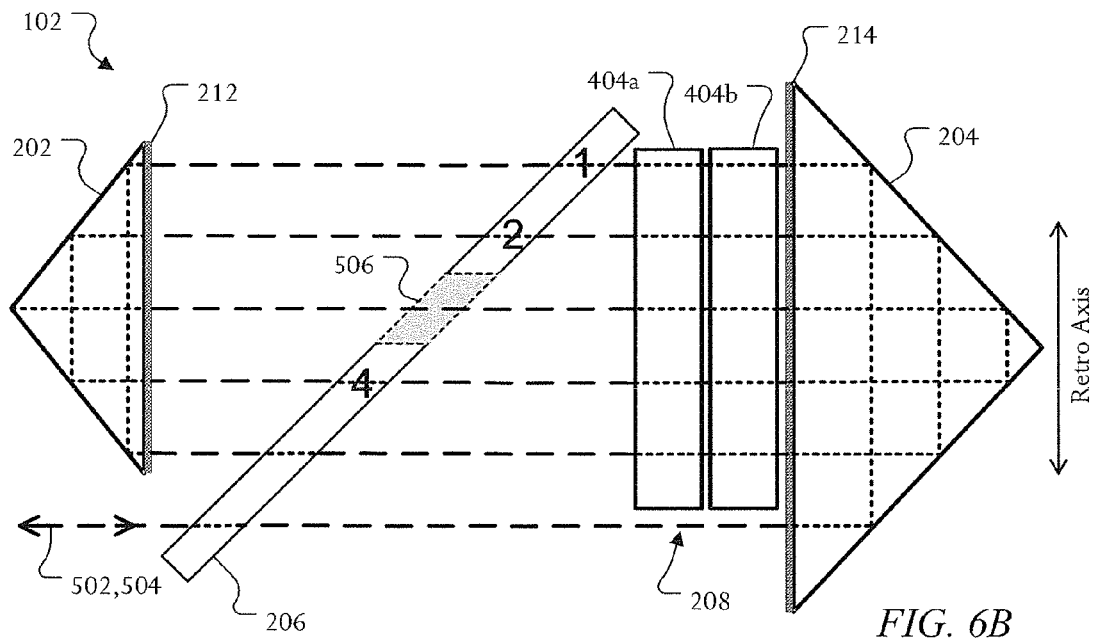

FIGS. 6A and 6B illustrate the multi-stage Lyot filter 102 in accordance with alternate embodiments of the present disclosure. For the embodiment illustrated in FIG. 6A, the polarizing block 206 comprises a first polarizing block 206a and a second polarizing block 206b, and the birefringent element 208 comprises a pair of wedges 404. The embodiment of the Lyot filter 102 shown in FIG. 6A corresponds to the three-dimensional illustration of the Lyot filter 102 shown in FIG.

3B. The tapered axes of the wedges 404 shown in FIG. 5A are perpendicular to the plane of the page in FIG. 6A. The wedges 404 are oriented in this fashion because of the birefringent splitting that occurs between the two polarization eigen-components of the birefringent crystal. Although this splitting is small for each pass through the wedges 404, it is amplified if the wedge taper axis is aligned to the retro axis of the two prisms 202 and 204. In addition, it will be understood that all the folds of the beam of light provided by the prisms 202 and 204 may not be visible in the two-dimensional illustration of FIG. 6A.

For this embodiment, an incoming beam of light 502 passes through the first polarizing block 206a and then passes through the birefringent element 208 once. After this, the beam is folded through the second prism 204 and passed through the birefringent element 208 a second time, before passing through the second polarizing block 206b (along the path labeled "2," which corresponds to the polarization of the beam after passing through the birefringent element 208 two times).

The beam of light then is folded through the first prism 202, passed through the birefringent element 208, folded through the second prism 204, passed back through the birefringent element 208, folded through the first prism 202, passed through the birefringent element 208 a third time, folded through the second prism 204, and passed back through the birefringent element 208 a fourth time. After this, the beam is folded through the first prism 202 before being passed through the second polarizing block 206b (along the path labeled "4"). At this point, the beam is folded through the second prism 204 and passed through the birefringent element 208 once before passing through the first polarizing block 206a (along the path labeled "1") and exiting the Lyot filter 102 as an outgoing beam of light 504.

For the embodiment illustrated in FIG. 6B, the polarizing block 206 comprises a single polarizing block, and the birefringent element 208 comprises a pair of wedges 404. It will be understood that all the folds of the beam of light provided by the prisms 202 and 204 may not be visible in the two-dimensional illustration of FIG. 6B. Furthermore, the axes of the wedges 404a and 404b may be perpendicular to the plane of the illustration and parallel to non-retro axes of the prisms 202 and 204. For this embodiment, an incoming beam of light 502 and an outgoing beam of light 504 are provided coaxially to and from the Lyot filter 102. Also, the polarizing block 206 comprises at least one opening 506.

For this embodiment, the incoming beam of light 502 passes through the polarizing block 206 and is folded through the second prism 204. The beam then passes through the birefringent element 208 once before passing back through the polarizing block 206 (along the path labeled "1," which corresponds to the polarization of the beam after passing through the birefringent element 208 one time). After this, the beam is folded through the first prism 202 and passed through the polarizing block 206 again (which does not substantially affect the beam at this point). The beam then passes through the birefringent element 208 and is folded through the second prism 204, before passing through the birefringent element 208 a second time. Next, the beam passes through the polarizing block 206 (along the path labeled "2").

After this, the beam is folded through the first prism 202, passed back through the polarizing block 206 (without being substantially affected), and passed through the birefringent element 208 once. The beam is then folded through the second prism 204 and passed back through the birefringent element 208 a second time, after which the beam passes through the opening 506 in the polarizing block 206, which prevents the beam from being polarized as it passes by this location. The beam is then reflected back from the first prism 202, passed back through the opening 506, and passed through the birefringent element 208 a third time. After this, the beam is folded through the second prism 204 and passed back through the birefringent element 208 a fourth time, before being passed through the polarizing block 206 (along the path labeled "4"). At this point, the beam is folded back and forth through the first prism 202 and the second prism 204 until the beam exits the Lyot filter 102 as the outgoing beam of light 504.

For some embodiments implemented as shown in FIG. 6B, the first prism 202 may function as the second reflector 108 in the optical cavity 100. Thus, for these embodiments, the second reflector 108 may be omitted as a separate component of the optical cavity 100. In these cases, the retro-reflecting roof surfaces of prism 202 may serve as the second reflector 108 in the optical cavity 100.

Figure 7:
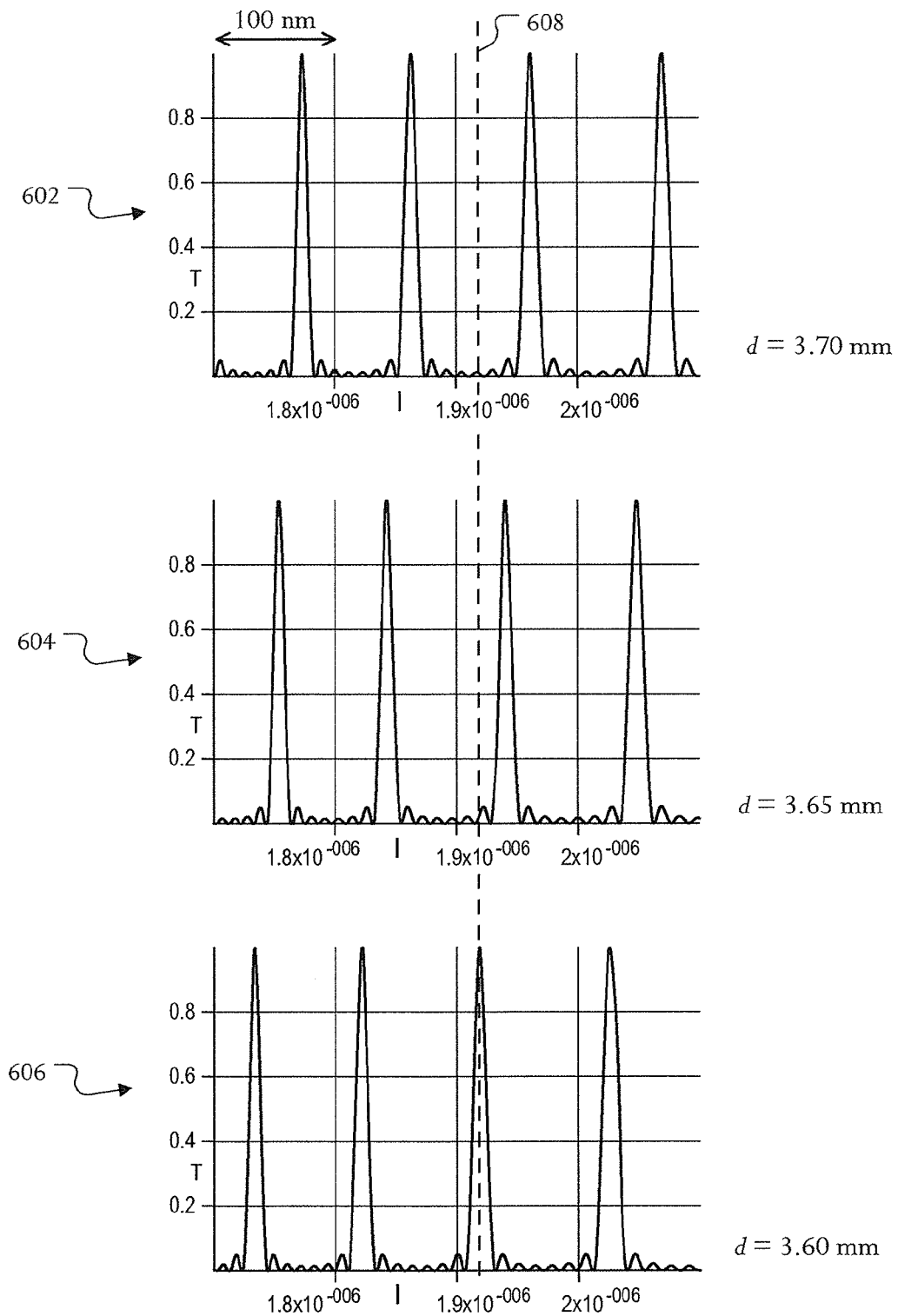
FIG. 7 is a series of graphs illustrating tuning of the multi-stage Lyot filter of FIG. 3A in accordance with the present disclosure.

FIG. 7 is a series of graphs illustrating tuning of the multi-stage Lyot filter 102 in accordance with the present disclosure. The Lyot filter 102 may be configured to tune an optical cavity 100 over a broad spectral range. For example, for the illustrated embodiment, the Lyot filter 102 may be configured to tune an optical cavity 100 over a spectral range of about 100 nm near 2 μm.

The thickness of the birefringent element 208 is given by a value of d. Thus, for a three-stage Lyot filter 102, the thicknesses provided by the birefringent element 208 are given by d, 2 d, and 4 d. In general, the thicknesses may be expressed as d, 2 d, 4 d, ... $2^{N-1}$ d, where N is the number of stages of the Lyot filter 102. As described above, the birefringent element 208 for the Lyot filter 102 may comprise a pair of wedges 404 or an electro-optic crystal 412.

The transmittance, T, of the Lyot filter 102 may be expressed as follows:

$$T = \left(\frac{\sin[2^N x]}{2^N \sin x}\right)^2,$$

where $x = \pi d \Delta n / \lambda$, $\Delta n$ is the birefringence of the plate, and $\lambda$ is the wavelength of the light passed by the Lyot filter 102. The peak wavelength, $\lambda_{peak}$, is proportional to $d\Delta n$. Therefore, as described above, the Lyot filter 102 may be tuned by varying the thickness or birefringence of the birefringent element 208.

As shown in FIG. 7, a first graph 602 illustrates the transmittance, T, of the Lyot filter 102 as a function of the wavelength, $\lambda$, when the thickness, d, is 3.70 mm. A second graph 604 illustrates the transmittance as a function of wavelength when the thickness has been adjusted down to 3.65 mm. Finally, a third graph 606 illustrates the transmittance as a function of wavelength when the thickness has been adjusted down to 3.60 mm. The dashed line 608 represents a desired peak wavelength for the Lyot filter 102. Therefore, as shown in the third graph 606, the Lyot filter 102 is tuned to the desired wavelength when the birefringent element 208 has a thickness of 3.60 mm. For all three graphs 602, 604 and 606, the birefringence of the plate, $\Delta n$, is $8.018 \times 10^{-3}$, the dispersion rate, $\alpha$, of the birefringence (i.e., $\partial(\Delta n)/\partial \lambda$) is $-1048.4$ m, the finesse (i.e., $1.13.2^N$) is 9, and the full width at half maximum (FWHM) bandwidth is 11 nm.

It will be understood that the Lyot filter 102 may be similarly tuned when the birefringent element 208 comprises an electro-optic crystal 412. For example, using the same characteristics described above, for an electro-optic crystal 412 with a thickness of 3.60 mm, the voltage adjustment circuit 414 may be used to vary the voltage applied to the electrodes 416 until the birefringence of the electro-optic crystal 412 reaches $8.018 \times 10^{-3}$ to achieve the same results in the tuning of the Lyot filter 102.

Figure 8:
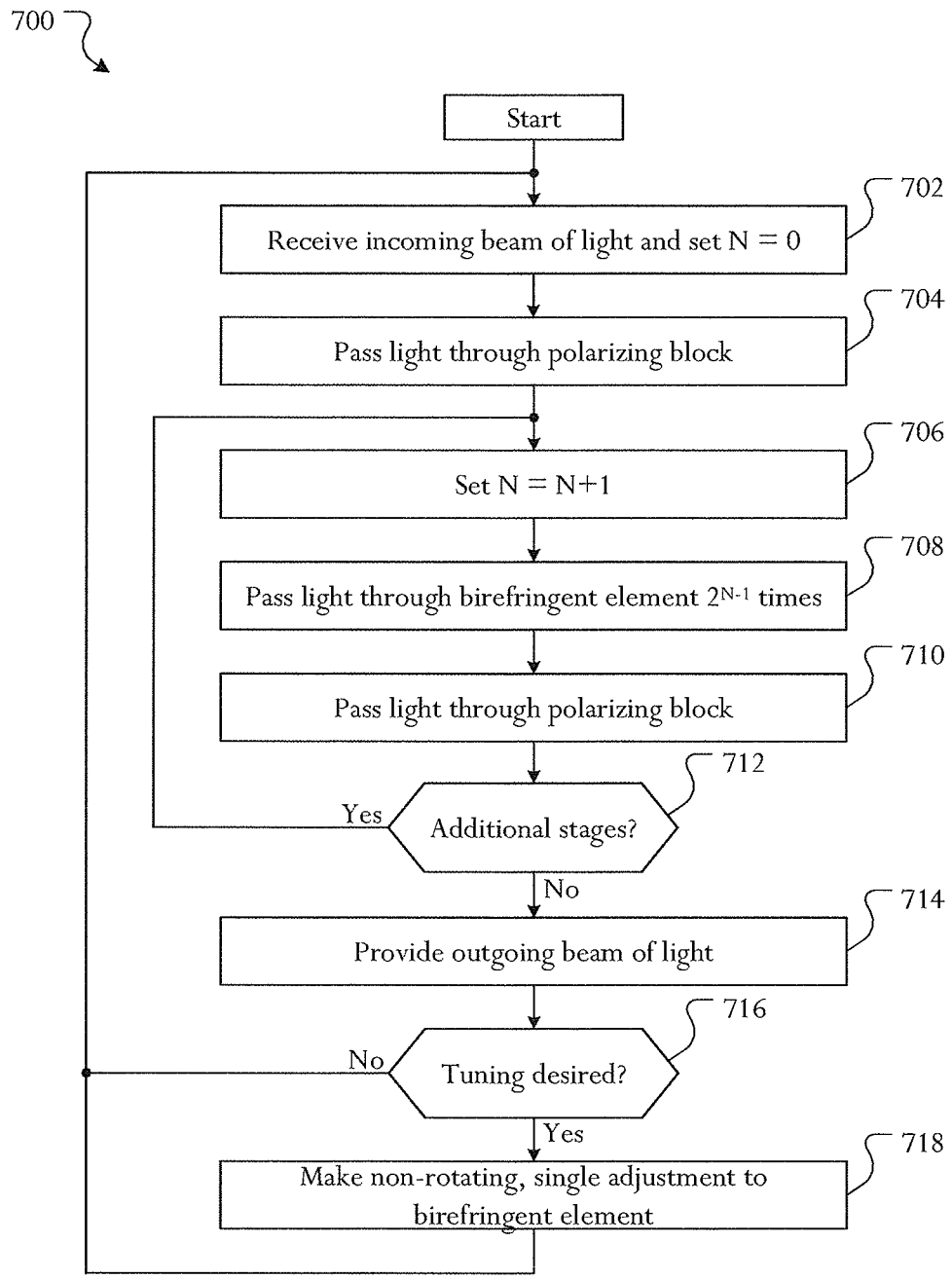
FIG. 8 is a flowchart illustrating a method for using the multi-stage Lyot filter of FIG. 3A in accordance with the present disclosure.

FIG. 8 is a flowchart illustrating a method 700 for using the multi-stage Lyot filter 102 in accordance with the present disclosure. The method 700 shown in FIG. 8 is for illustration only. The Lyot filter 102 may be used in any other suitable manner without departing from the scope of this disclosure.

An incoming beam of light 502 is received at the Lyot filter 102 (step 702). In addition, a variable N is set to zero. It will be understood that the Lyot filter 102 does not actually set a variable of N to zero; however, the variable N is useful in describing the operation of the Lyot filter 102 according to the method 700. The incoming beam of light 502 is passed through the polarizing block 206 (step 704). For some embodiments, the incoming beam of light 502 may pass through a prism, such as the prism 202 or 204, before passing through the polarizing block 206.

The value of the variable N is incremented (step 706) and the beam of light is passed through the birefringent element 208 $2^{N-1}$ times (step 708). Thus, initially, with N=1, the beam of light is passed through the birefringent element 208 one time. The beam of light may be passed through one or both prisms 202 or 204 any suitable number of times before being passed through the birefringent element 208. After passing through the birefringent element 208 $2^{N-1}$ times, the beam of light is passed through the polarizing block 206 again (step 710). The beam of light may also be passed through one or both prisms 202 or 204 any suitable number of times before being passed through the polarizing block 206.

If there are additional stages remaining (step 712) after the light passes through the polarizing block 206 (step 710), the value of the variable N is incremented again (step 706) and the light is passed through the birefringent element 208 $2^{N-1}$ times using the incremented value of N (step 708). Thus, with N=2, for example, the beam of light is passed through the birefringent element 208 two times. The beam of light may be passed through one or both prisms 202 or 204 any suitable number of times before being passed through the birefringent element 208 the first time and any suitable number of times before being passed through the birefringent element 208 the second time. After passing through the birefringent element 208 $2^{N-1}$ times, the beam of light is passed through the polarizing block 206 again (step 710). The beam of light may also be passed through one or both prisms 202 or 204 any suitable number of times before being passed through the polarizing block 206. Once there are no additional stages remaining (step 712), the Lyot filter 102 provides the outgoing beam of light 504 (step 714), which corresponds to a filtered version of the incoming beam of light 502.

Based on the outgoing beam of light 504, a determination may be made regarding whether or not tuning of the Lyot filter 102 is desired (step 716). For example, the outgoing beam of light 504 may be analyzed to determine its peak wavelength, and the peak wavelength may be compared to a desired peak wavelength in order to determine if the Lyot filter 102 should be tuned. If the Lyot filter 102 is providing the outgoing beam of light 504 with the desired characteristics such that no tuning is desired (step 716), the Lyot filter 102 may continue to receive incoming beams of light 502 for filtering (step 702).

However, if a determination is made that tuning of the Lyot filter 102 is desired (step 716), a non-rotating, single adjustment is made to the birefringent element 208 (step 718) in order to tune the Lyot filter 102, after which the Lyot filter 102 continues to receive incoming beams of light 502 to be filtered based on the tuning of the Lyot filter 102 (step 702). For example, for some embodiments in which the birefringent element 208 comprises a pair of wedges 404, the Lyot filter 102 may be tuned by linearly translating one or both of the wedges 404a and 404b. For other embodiments in which the birefringent element 208 comprises an electro-optic crystal 412, the Lyot filter 102 may be tuned by adjusting the voltage differential provided to the electrodes 416 by the voltage adjustment circuit 414.

In this way, the Lyot filter 102 may be tuned with a single adjustment and without rotating any components. Thus, the Lyot filter 102 may be more easily packaged as compared to a Lyot filter that requires rotation in order to provide tuning. In addition, the Lyot filter 102 may be tuned without affecting resonator alignment. The Lyot filter 102 may also be implemented in a Q-switched laser. Furthermore, because this method 700 provides for multi-passing the beam of light through a single birefringent element 208 and a single polarizing block 206, the Lyot filter 102 may provide multiple stages without adding additional components for each additional stage.

Although FIG. 8 illustrates one example of a method 700 for using the Lyot filter 102, various changes may be made to FIG. 8. For example, while shown as a series of steps, various steps in FIG. 8 could overlap, occur in parallel, occur in a different order, or occur multiple times. In addition, as described above, the beam of light may pass through the birefringent element 208 a specified number of times in any suitable order. For example, although the illustrated method provides for the beam of light to pass through the birefringent element 208 once, then twice, then four times for a three-stage Lyot filter 102, it will be understood that the beam of light may pass through the birefringent element 208 twice, then four times, then once or in any other order.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses may be performed by more, fewer, or other components. The methods may include more, fewer, or other steps. Additionally, as described above, steps may be performed in any suitable order.

It may be advantageous to set forth definitions of certain words and phrases used throughout this patent document. The "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A multi-stage Lyot filter comprising:
a plurality of prisms, wherein each of the prisms is configured to receive light and to reflect the light;
a polarizing block configured to provide polarization discrimination of the light; and
a non-rotating, single-adjustment birefringent element configured to tune the Lyot filter, wherein the prisms are further configured to pass the light through the birefringent element multiple times.

2. The multi-stage Lyot filter of claim 1, wherein the Lyot filter comprises a first stage, a second stage and a third stage, and wherein the prisms are configured to pass the light through the birefringent element one time for the first stage, two times for the second stage, and four times for the third stage.

3. The multi-stage Lyot filter of claim 2, wherein the prisms are further configured to pass the light through the polarizing block at least once before passing the light through the birefringent element and to pass the light through the polarizing block at least once after each of the stages.

4. The multi-stage Lyot filter of claim 1, wherein the birefringent element comprises a pair of tapered wedges, wherein at least one of the wedges is configured to be linearly translated with respect to the other wedge to adjust a thickness of the birefringent element, and wherein the birefringent element is configured to tune the Lyot filter based on a linear translation of the at least one wedge.

5. The multi-stage Lyot filter of claim 1, wherein the birefringent element comprises an electro-optic crystal, and wherein the birefringent element is configured to tune the Lyot filter by varying a voltage applied to the electro-optic crystal to adjust a birefringence of the birefringent element.

6. The multi-stage Lyot filter of claim 1, further comprising:
a first polarization rotation compensator configured to compensate for geometrical polarization rotation in a first one of the prisms; and
a second polarization rotation compensator configured to compensate for geometrical polarization rotation in a second one of the prisms.

7. The multi-stage Lyot filter of claim 6, wherein the first prism and the second prism each comprises a Benson prism, and wherein the first polarization rotation compensator and the second polarization rotation compensator each comprises a quarter-wavelength plate layer.

8. The multi-stage Lyot filter of claim 1, wherein the polarizing block comprises at least one uncoated Brewster plate.

9. The multi-stage Lyot filter of claim 1, wherein the polarizing block comprises at least one opening at a specified location to prevent the polarizing block from providing polarization discrimination of the light when the light passes by the specified location.

10. An optical cavity comprising:
a gain medium configured to provide optical gain for light in the optical cavity;
a Q-switch configured to provide variable attenuation for the optical cavity;
a reflector configured to partially reflect the light; and
a multi-stage Lyot filter configured to pass a specified band of wavelengths of the light, wherein the Lyot filter comprises a non-rotating, single-adjustment birefringent element configured to tune the Lyot filter and multiple prisms configured to pass the light through the birefringent element multiple times.

11. The optical cavity of claim 10, wherein the Lyot filter comprises a first stage, a second stage and a third stage, and wherein the prisms are configured to pass the light through the birefringent element one time for the first stage, two times for the second stage, and four times for the third stage.

12. The optical cavity of claim 11, wherein the Lyot filter further comprises a polarizing block configured to provide polarization discrimination of the light.

13. The optical cavity of claim 12, wherein the prisms are further configured to pass the light through the polarizing block at least once before passing the light through the birefringent element and to pass the light through the polarizing block at least once after each of the stages.

14. The optical cavity of claim 10, wherein the birefringent element comprises a pair of tapered wedges, wherein at least one of the wedges is configured to be linearly translated with respect to the other wedge to adjust a thickness of the birefringent element, and wherein the birefringent element is configured to tune the Lyot filter based on a linear translation of the at least one wedge.

15. The optical cavity of claim 10, wherein the birefringent element comprises an electro-optic crystal, and wherein the birefringent element is configured to tune the Lyot filter by varying a voltage applied to the electro-optic crystal to adjust a birefringence of the birefringent element.

16. The optical cavity of claim 10, wherein the multiple prisms each comprise a Benson prism, and wherein the Lyot filter further comprises, for each prism, a polarization rotation compensator comprising a quarter-wavelength plate layer.

17. A method comprising:
receiving light at a multi-stage Lyot filter that comprises a non-rotating, single-adjustment birefringent element;
passing the light through the birefringent element multiple times to generate filtered light; and
providing the filtered light as an output of the Lyot filter.

18. The method of claim 17, wherein the Lyot filter comprises a first stage, a second stage and a third stage, and wherein passing the light through the birefringent element multiple times comprises passing the light through the birefringent element one time for the first stage, two times for the second stage, and four times for the third stage, the method further comprising:
polarizing the light at least once before passing the light through the birefringent element; and
polarizing the light at least once after each of the stages.

19. The method of claim 17, wherein the birefringent element comprises a pair of tapered wedges, the method further comprising tuning the Lyot filter with the birefringent element by linearly translating at least one of the wedges.

20. The method of claim 17, wherein the birefringent element comprises an electro-optic crystal, the method further comprising tuning the Lyot filter with the birefringent element by varying a voltage applied to the electro-optic crystal to adjust a birefringence of the birefringent element.

* * * * *